United States Patent
Jackson (10) Patent No.: US 11,525,486 B2
(45) Date of Patent: Dec. 13, 2022

(54) ZERO DRAG BAULK RING SYNCHRONIZER

(71) Applicant: Eaton Cummins Automated Transmission Technologies, LLC, Galesburg, MI (US)

(72) Inventor: Graeme Andrew Jackson, Kalamazoo, MI (US)

(73) Assignee: Eaton Cummins Automated Transmission Technologies LLC, Galesburg, MI (US)

( * ) Notice: Subject to any disclaimer, the term of this patent is extended or adjusted under 35 U.S.C. 154(b) by 55 days.

(21) Appl. No.: 17/206,512

(22) Filed: Mar. 19, 2021

(65) Prior Publication Data
US 2022/0299069 A1  Sep. 22, 2022

(51) Int. Cl.
*F16D 23/02* (2006.01)
*F16D 23/06* (2006.01)

(52) U.S. Cl.
CPC .......... *F16D 23/025* (2013.01); *F16D 23/06* (2013.01); *F16D 2023/0618* (2013.01); *F16D 2023/0662* (2013.01)

(58) Field of Classification Search
CPC .................... F16D 23/025–2023/0693
See application file for complete search history.

(56) References Cited

U.S. PATENT DOCUMENTS

| | | | |
|---|---|---|---|
| 2,221,894 A * | 11/1940 | White | F16D 23/06 192/53.341 |
| 4,271,943 A * | 6/1981 | Kuzma | F16D 23/025 192/48.91 |
| 4,576,062 A | 3/1986 | Reppert et al. | |
| 5,085,303 A | 2/1992 | Frost | |
| 5,113,986 A * | 5/1992 | Frost | F16D 23/06 192/53.341 |
| 5,638,930 A | 6/1997 | Parsons | |
| 2005/0217966 A1 | 10/2005 | Hornbrook et al. | |
| 2008/0302624 A1* | 12/2008 | Steinz | F16D 23/06 192/53.341 |
| 2011/0214522 A1 | 9/2011 | Sporleder et al. | |
| 2014/0090499 A1 | 4/2014 | Fernandez | |

FOREIGN PATENT DOCUMENTS

DE   102010019453 A1 * 11/2011 ............. F16D 23/06

* cited by examiner

*Primary Examiner* — David R Morris
(74) *Attorney, Agent, or Firm* — Harness, Dickey & Pierce, P.L.C.

(57) ABSTRACT

A synchronizer assembly includes a pair of engageable members each including an exterior cone surface and first exterior splines. A central synchronizer ring is disposed between the pair of engageable members and having second exterior splines. A pair of synchronizer cone rings are disposed on opposite sides of the central synchronizer ring and each include third exterior splines and an interior cone surface that oppose the exterior cone surface of respective ones of the pair of engageable members. A sliding synchronizer sleeve engages the second exterior splines of the central synchronizer ring and movable for engaging the third exterior splines of the pair of synchronizer cone rings and the first exterior splines of the pair of engageable members. A plurality of interlocking clips engage the pair of synchronizer cone rings.

17 Claims, 10 Drawing Sheets

ZERO DRAG BAULK RING SYNCHRONIZER

FIELD

The present disclosure is directed to transmissions configured for coupling to a prime mover, and more particularly to a synchronizer for transmissions for vehicle applications, including truck applications.

BACKGROUND

Transmissions serve a critical function in translating power provided by a prime mover to a final load. The transmission serves to provide speed ratio changing between the prime mover output (e.g. a rotating shaft) and a load driving input (e.g. a rotating shaft coupled to wheels, a pump, or other device responsive to the driving shaft). The ability to provide selectable speed ratios allows the transmission to amplify torque, keep the prime mover and load speeds within ranges desired for those devices, and to selectively disconnect the prime mover from the load at certain operating conditions.

Transmissions are subjected to a number of conflicting constraints and operating requirements. For example, the transmission must be able to provide the desired range of torque multiplication while still handling the input torque requirements of the system. Previously known transmission systems suffer from one or more drawbacks within a system as described following. Previously known high output transmissions, such as for trucks, typically include multiple interfaces to the surrounding system (e.g. electrical, air, hydraulic, and/or coolant), each one requiring expense of design and integration, and each introducing a failure point into the system. Previously known high output transmissions utilize concentric clutches which require complex actuation and service. Previously known high output transmissions utilize a synchronizer ring to shift between gears, and a pre-energizer spring system to create a limited torque required to shift into engaged positions. Once in an engaged position, the pre-energizer spring and ring can cause unwanted friction losses. Accordingly, there remains a need for improvements in the design of high output transmissions, particularly synchronizers for truck transmissions.

SUMMARY

A synchronizer assembly including a pair of engageable members each including an exterior cone surface and first exterior splines. A central synchronizer ring disposed between the pair of engageable members and having second exterior splines. The central synchronizer ring having a plurality of locations where the second exterior splines are discontinued wherein each of the plurality of locations includes a cavity supporting a spring and roller. A pair of synchronizer cone rings are disposed on opposite sides of the central synchronizer ring and each include third exterior splines and an interior cone surface that oppose the exterior cone surface of respective ones of the pair of engageable members. The pair of synchronizer cone rings having axially projecting lugs at the plurality of locations where the second exterior splines are discontinued. A sliding synchronizer sleeve engages the second exterior splines of the central synchronizer ring and movable for engaging the third exterior splines of the pair of synchronizer cone rings and the first exterior splines of the pair of engageable members. A plurality of interlocking clips engage the pair of synchronizer cone rings at the plurality of locations where the second exterior splines are discontinued and including an aperture for receiving the roller. The present disclosure is shown applied to a transmission range synchronizer but is not limited to such position. The present disclosure can be applied to any synchronizer location.

DRAWINGS

The disclosure and the following detailed description of certain embodiments thereof may be understood by reference to the following figures.

DETAILED DESCRIPTION

Figure 1A:
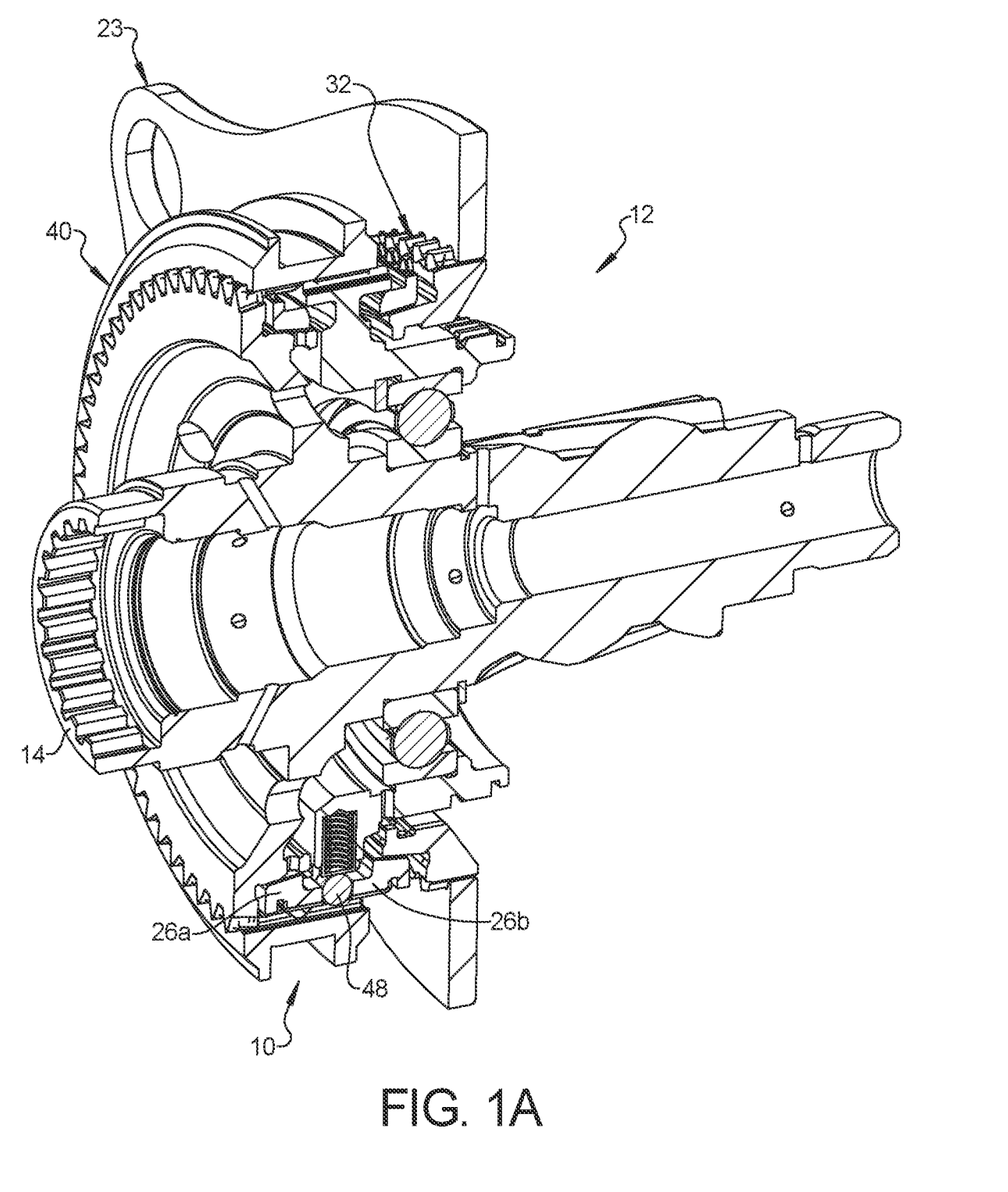
FIG. 1A is a cross-sectional perspective view of a synchronizer assembly according to the principles of the present disclosure.
Figure 1B:
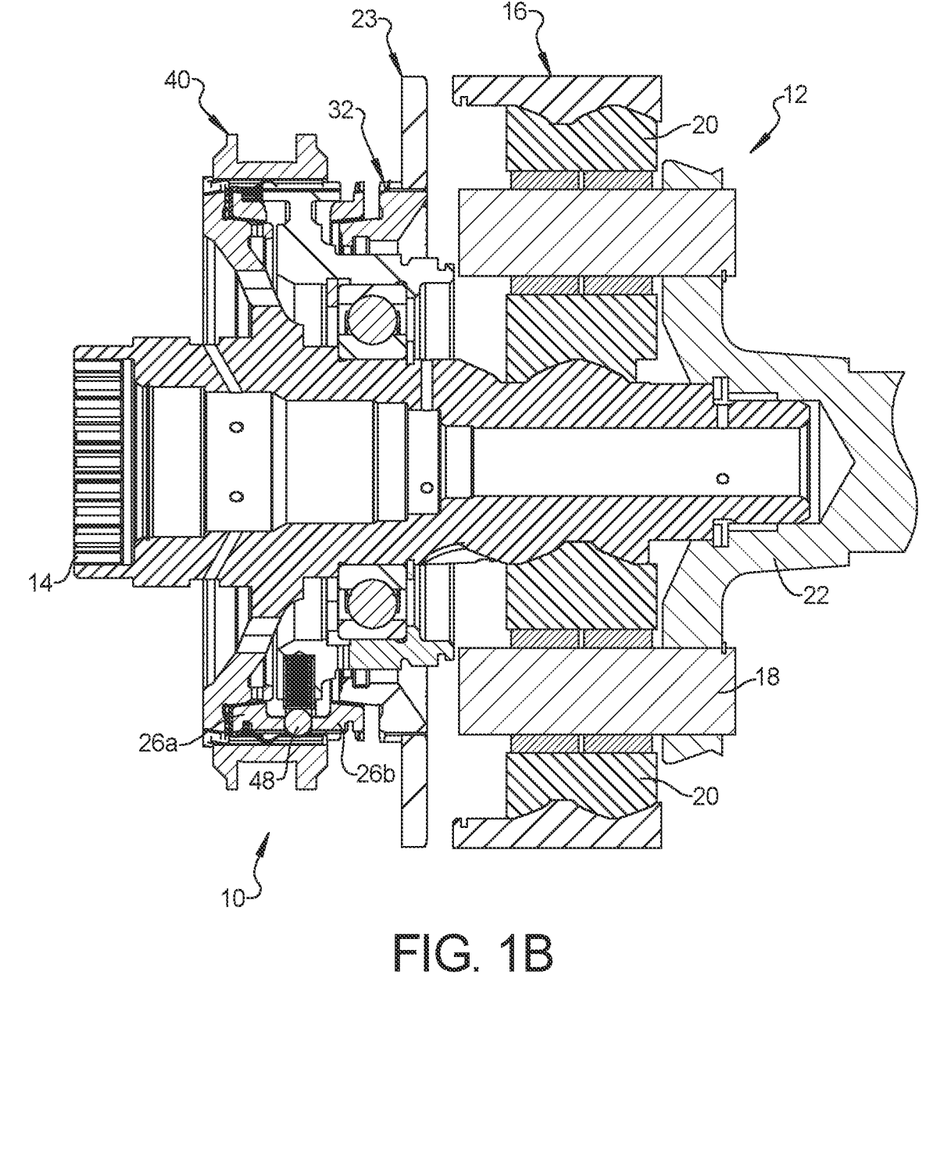
FIG. 1B is a cross-sectional view of a synchronizer assembly and range gear assembly according to the principles of the present disclosure.

With reference to FIGS. 1A and 1B, a synchronizer assembly 10 is shown associated with a range gear assembly 12 (FIG. 1B) of a manual or automated transmission. In the exemplary embodiment as shown in FIG. 1B, the planetary gear assembly 12 includes a sun gear shaft 14, a planetary annulus gear 16 and a planetary carrier 18 supporting a plurality of planetary gears 20 and providing output to an output shaft 22. The planetary gears 20 are in meshing engagement with the sun gear 14 and the annulus gear 16.

With reference to FIG. 1A, the synchronizer assembly 10 is provided for selectively engaging the sun gear shaft 14 to the planetary annulus gear 16 or selectively engaging the planetary annulus gear 16 to a fixed synchronizer hub 23 for shifting the planetary gear assembly between a fixed range drive mode and a reduction range drive mode. Although the synchronizer assembly 10 is shown associated with a planetary gear assembly, it should be understood that the present synchronizer assembly 10 can be associated with other transmission shift sleeves.

With reference to FIGS. 2-6, the synchronizer assembly 10 includes a central synchronizer ring 24 and a pair of synchronizer cone rings 26a, 26b that are disposed on opposite sides of the central synchronizer ring 24. The synchronizer cone rings 26a, 26b each include an internal cone surface 27 that is adapted to frictionally engage a respective exterior cone surface 28 on the sun gear shaft 14 and an exterior cone surface 30 on the synchronizer flange 32 connected to the fixed synchronizer plate 23. The central synchronizer ring 24 further includes an external splined tooth surface 34 (best shown in FIGS. 3 and 5). The pair of synchronizer cone rings 26a, 26b each include laterally spaced spline surfaces 36a, 36b laterally spaced from the splined tooth surface 34 of the central synchronizer ring 24. A synchronizer sliding sleeve 40 includes an internal splined tooth surface 42 engaging the external splined tooth surface 34 of the central synchronizer ring 24. The synchronizer sliding sleeve 40 includes a circumferential external groove 44 that can be engaged by a yoke (not shown) for sliding the sliding sleeve 40 in a fore and aft direction for selectively engaging the internal splined tooth surface 42 of the sliding sleeve 40 to splines 36a, 36b of the synchronizer cone rings 26a, 26b and to external splines 14a of the sun gear shaft 14 or external splines 32a of the synchronizer flange 32 connected to the fixed synchronizer plate 23. During a shifting operation of the sliding sleeve 40, the cone surfaces 27 of the synchronizer cone rings 26a, 26b provide a friction engagement with the cone surface 28 of the sun gear shaft 14 or alternatively with the cone surface 30 of the synchronizer flange 32. The frictional engagement of the synchronizer cone rings 26a, 26b with either the sun gear shaft 14 or the synchronizer flange 32 brings the relative rotational speed of the components into conformity to allow the sliding sleeve 40 to engage the splines 14a of the sun gear shaft 14 or the splines 32a of the synchronizer flange 32 during a shifting operation.

Figure 5:
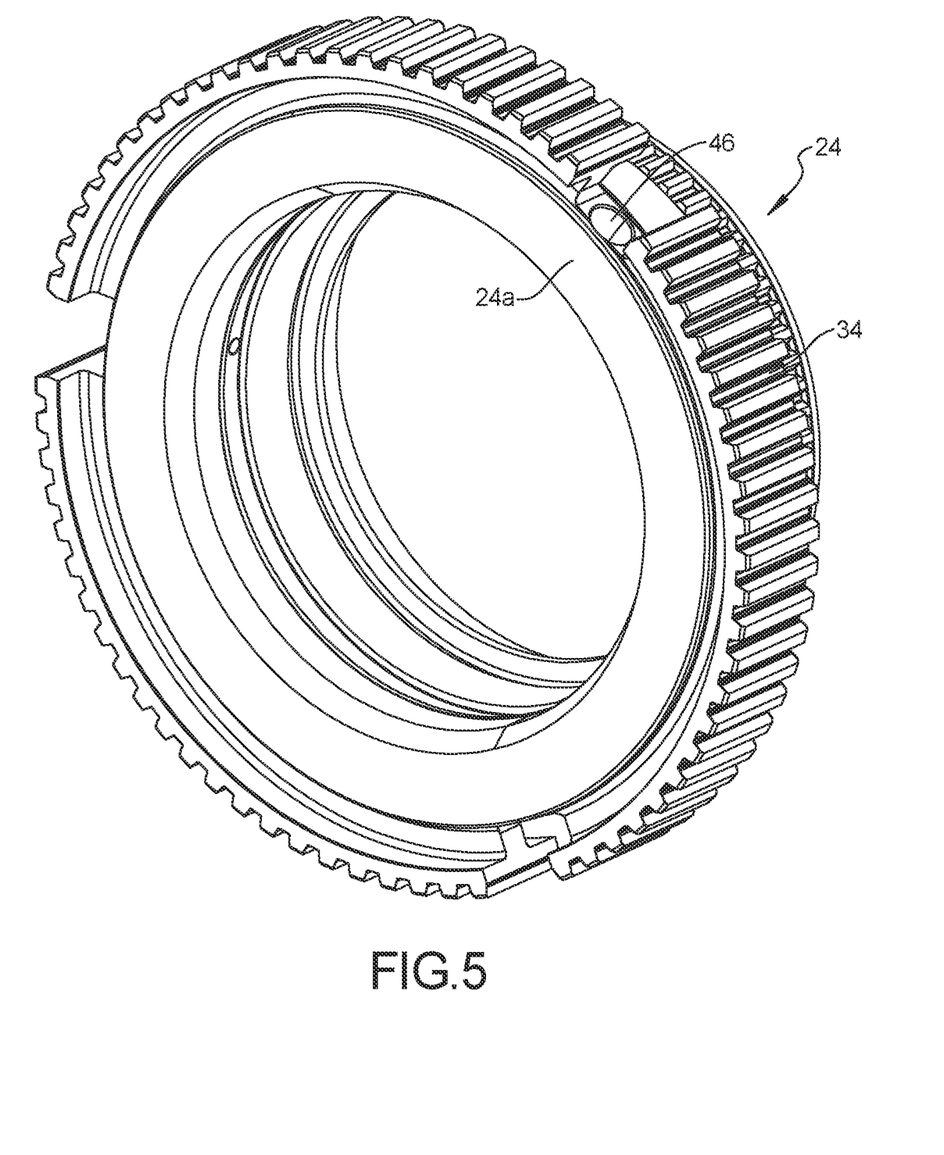
FIG. 5 is a perspective view of the synchronizer ring according to the principles of the present disclosure.

As best shown in FIG. 5, the central synchronizer ring 24 includes a plurality of apertures 46 for receiving a respective roller 48 therein that engages an interior surface 50 of the sliding sleeve 40. The rollers 48 can include a cylindrical roller or a ball. A hub 24A of the synchronizer ring 24 supports a plurality of spring biased plungers 52 that engage the rollers 48. The spring biased plungers 52 include a spring 53 received therein. The interior surface 50 of the sliding sleeve 40 includes a centrally located neutral detent 54, a forward engagement detent 56 and an aft engagement detent 58 that are engaged by the roller 48 as the sliding sleeve 40 is moved from the neutral to the forward and aft engaged positions.

Figure 2:
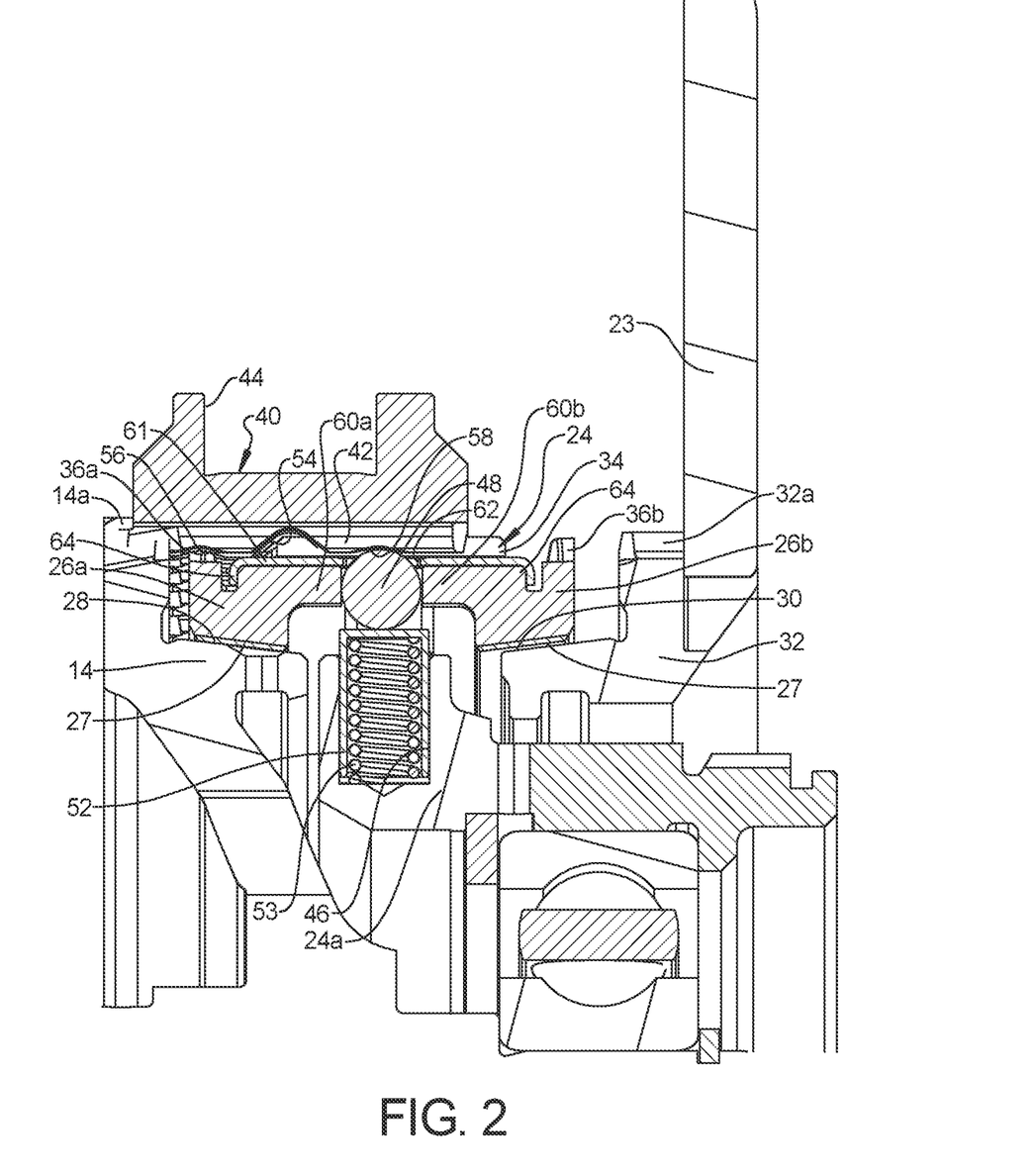
FIG. 2 is a cross-sectional view of a synchronizer shown in an engaged position and having an interlocking clip according to the principles of the present disclosure.
Figure 6:
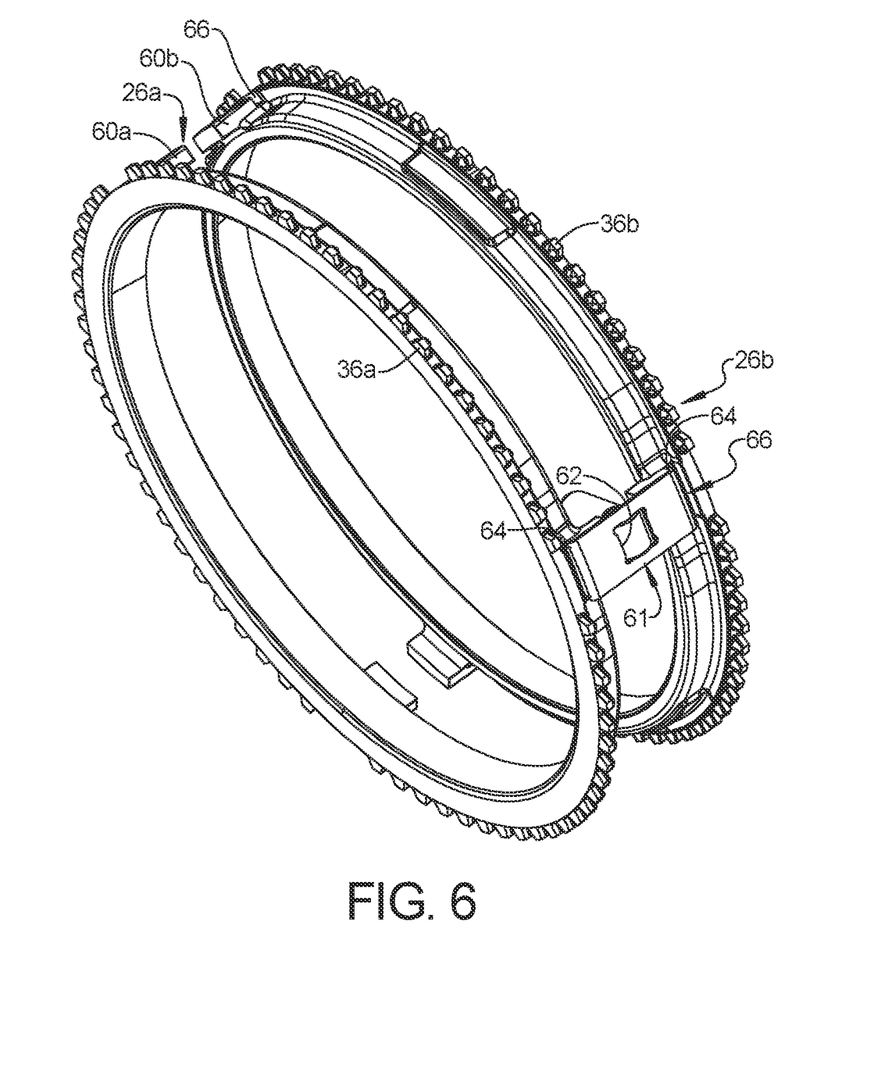
FIG. 6 is a partial perspective view of the pair of synchronizer cone rings illustrating the interlocking clip engaged therewith with other components removed for illustration purposes.

As shown in FIGS. 2 and 6, each synchronizer cone ring 26a, 26b includes a plurality of protruding portions 60a, 60b that are provided at the locations of each of the rollers 48 where the external splined tooth surface 34 is discontinued. With reference to FIGS. 2-4 and 6, the synchronizer cone rings 26a, 26b are clipped together by a plurality of interlocking clips 61 that are located above each of the protruding portions 60a, 60b. Each of the interlocking clips 61 include an aperture 62 for receiving the roller 48 and a pair of end retainer flanges 64 for engaging a pair of ledges 66 on the synchronizer cone rings 26a, 26b.

The interlocking clips 61 link the synchronizer ring cones 26a, 26b together so that during a shifting event as one of the synchronizer cone rings 26a, 26b is brought into lateral engagement with its respective cone surfaces 28, 30, the interlocking clips 61 insure that the opposite synchronizer cone ring 26a, 26b is disengaged from its respective exterior cone surface 28 or 30 so there is no drag.

Figure 7:
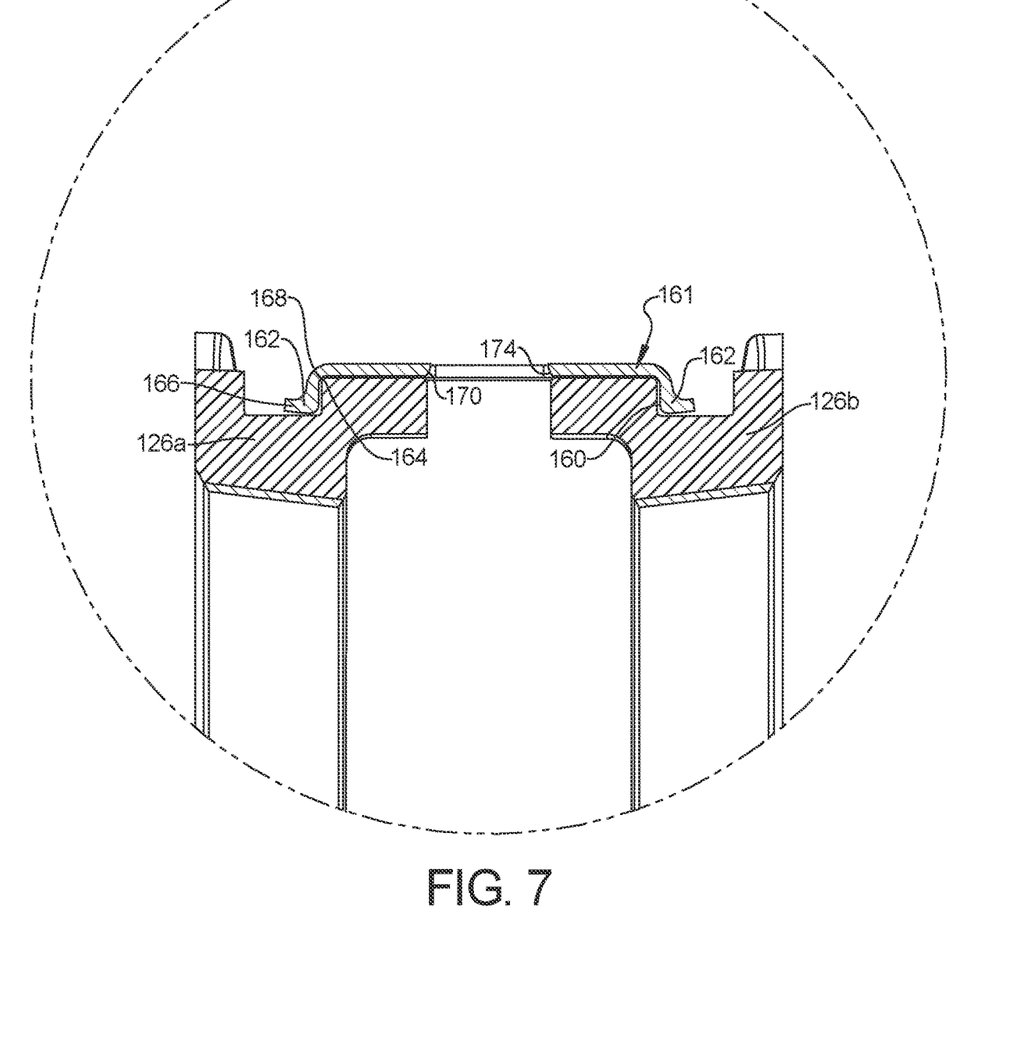
FIG. 7 is a cross-sectional view of a pair of synchronizer cone rings with other components removed for illustration purposes and having an alternative interlocking clip according to the principles of the present disclosure.
Figure 8:
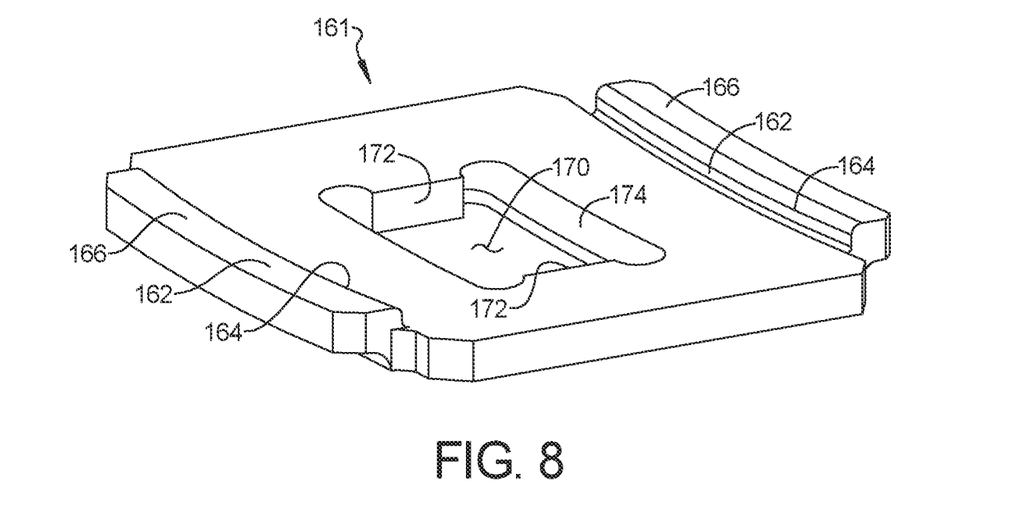
FIG. 8 is a perspective view of the interlocking clip shown in FIG. 7.

The interlocking clips 61 and the ledges 66 of the synchronizer ring 24 can take on alternative forms. With reference to FIGS. 7 and 8 the interlocking clips 161 are formed as a stamped plate with the retainer flanges 162 being bent to form a step 164 and then having flat laterally extending legs 166. The steps 164 engage a pair of ledges 168 of the synchronizer cone rings 126a, 126b. The interlocking clips 161 include an aperture 170 that includes a pair of protrusions 172 that engage the ends of the rollers 48. The aperture 170 in the interlocking clips 161 can include sidewalls 174 that are inclined so as to taper inward toward one another on an outboard side, as shown in FIG. 7.

Figure 9:
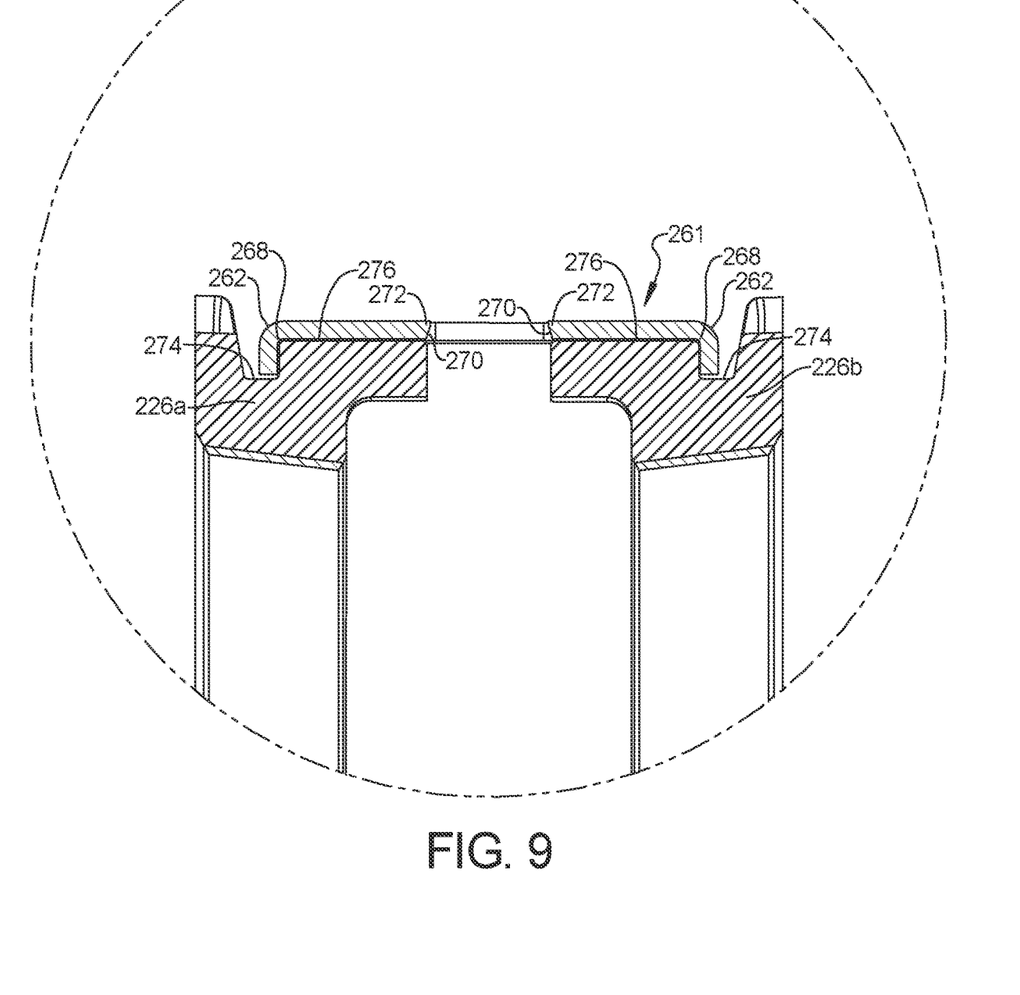
FIG. 9 is a cross-sectional view of an interlocking clip engaging a pair of synchronizer cone rings according to an alternative embodiment.
Figure 10:
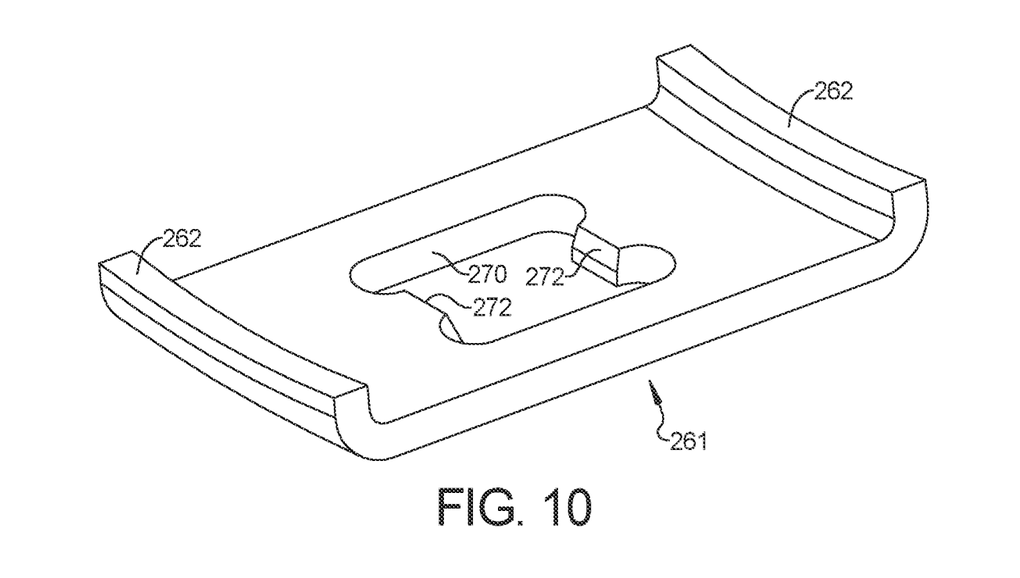
FIG. 10 is a perspective view of the interlocking clip shown in FIG. 9.

With reference to FIGS. 9 and 10 the interlocking clips 261 can be bent to form curved end retainer flanges 262. The flanges 262 engage a pair of ledges 268 of the synchronizer cone rings 226a, 226b. The interlocking clips 261 include an aperture 270 that includes a pair of protrusions 272 that engage the sides of the rollers 48. As shown in FIG. 9, the synchronizer cone rings 226a, 226b further includes recessed channels 274 on opposite sides of a lug 276. The interlocking clips 261 are received on the lugs 276.

Figure 3:
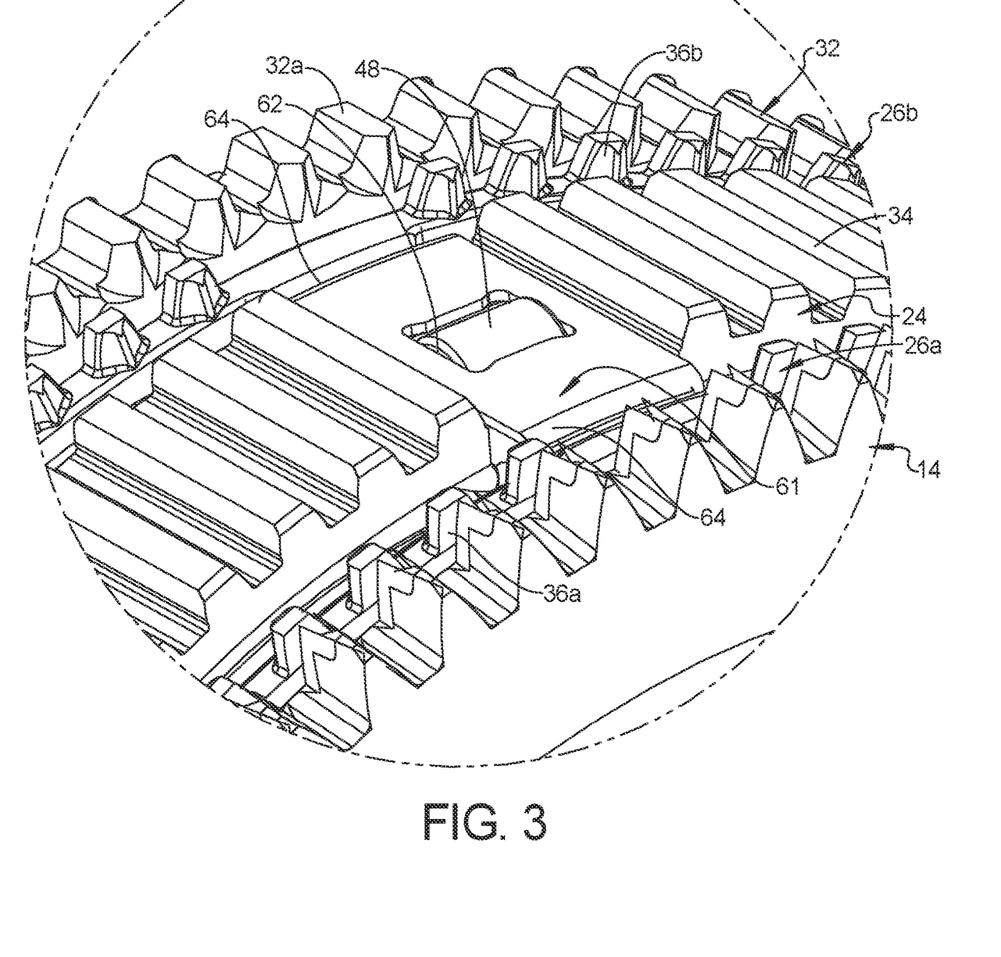
FIG. 3 is a perspective view of the interlocking clip mounted to the synchronizer ring according to the principles of the present disclosure.
Figure 4:
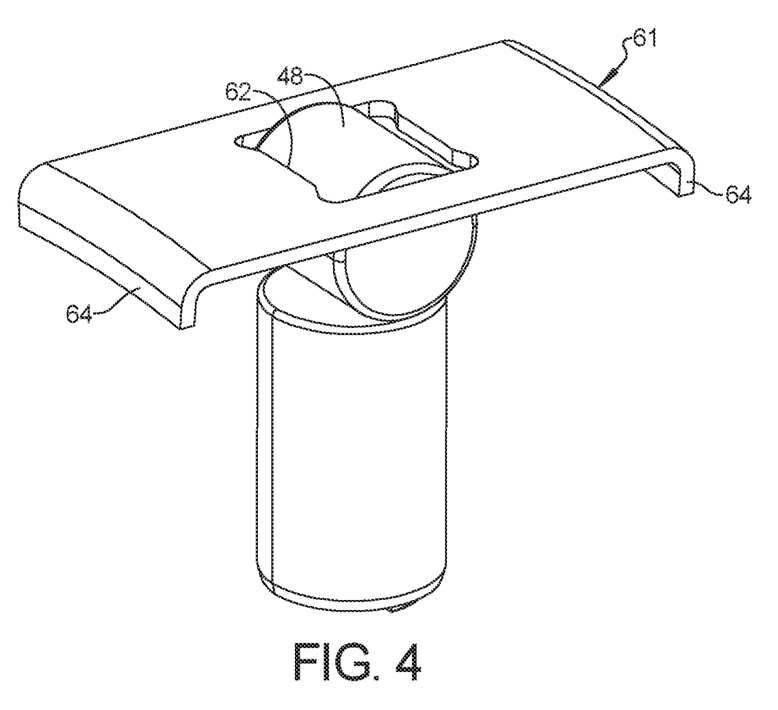
FIG. 4 is a perspective view of a spring biased plunger and interlocking clip according to the principles of the present disclosure.

The interlocking clips 61, 161, 261 according to the principles of the present disclosure, allow the system to be optimized to allow the synchronizer cone rings 26a, 26b to be interlocked close together. This means that the ring/strut assembly has to travel two times the maximum wear gap G, of for example 7 mm, between the synchronizer central ring 24/synchronizer cone rings 26a, 26b assembly and the synchronizer flange 32 when the synchronizer ring 24 is engaged with the external splines 14a of the sun gear shaft 14, as illustrated in FIG. 3. The interlocking clips 61, 161, 261 are designed to accommodate wear gap on both sides of the ring and guarantee gap at the disengaged synchronizer cone ring 26a, 26b.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A synchronizer assembly, comprising:
   a pair of engageable members each including a first cone surface and first exterior splines;
   a central synchronizer ring disposed between the pair of engageable members and having second exterior splines, the central synchronizer ring having a plurality of locations having a cavity supporting a spring and roller wherein the spring biases the roller in a radially outward direction;
   a pair of synchronizer cone rings disposed on opposite sides of the central synchronizer ring, the pair of synchronizer cone rings each including third exterior splines and a second cone surface opposing the first cone surface of respective ones of the pair of rotary members;
   a sliding synchronizer sleeve engaging the second exterior splines of the central synchronizer ring and movable for engaging the third exterior splines of the pair of synchronizer cone rings and the first exterior splines of the pair of engageable members; and
   a plurality of interlocking clips each including a pair of end flanges having opposing inner surfaces engaging a pair of ledges on the pair of synchronizer cone rings.

2. The synchronizer assembly of claim 1, wherein the central synchronizer ring includes a plurality of locations where the second exterior splines are discontinued, each of the plurality of locations having a cavity supporting a spring and roller wherein the spring biases the roller in a radially outward direction.

3. The synchronizer assembly of claim 2, the pair of synchronizer cone rings having axially projecting lugs at the plurality of locations where the second exterior splines are discontinued.

4. The synchronizer assembly of claim 3, wherein the plurality of interlocking clips are disposed against the axially projecting lugs of the pair of synchronizer cone rings.

5. The synchronizer assembly of claim 4, wherein the ledges of the synchronizer cone rings are adjacent to the axially projecting lugs.

6. The synchronizer assembly of claim 5, wherein a gap is provided between respective axially projecting lugs of the pair of synchronizer cone rings and the roller is disposed in the gap.

7. The synchronizer assembly of claim 2, wherein each of the plurality of interlocking clips include an aperture that receives the roller therein.

8. The synchronizer assembly of claim 7, wherein a pair of sidewalls of the aperture in the interlocking clips are inclined so as to taper inward toward one another on an outboard side.

9. The synchronizer assembly of claim 7, wherein a pair of sidewalls of the aperture in the interlocking clips include a pair of protrusions.

10. A synchronizer assembly, comprising:
    a pair of engageable members each including an exterior cone surface and first exterior splines;
    a central synchronizer ring disposed between the pair of engageable members and having second exterior splines, the central synchronizer ring having a plurality of locations where the second exterior splines are discontinued, each of the plurality of locations having a cavity supporting a spring and roller wherein the spring biases the roller in a radially outward direction;
    a pair of synchronizer cone rings disposed on opposite sides of the central synchronizer ring, the pair of synchronizer cone rings each including third exterior splines and an interior cone surface opposing the exterior cone surface of respective ones of the pair of rotary members, the pair of synchronizer cone rings having axially projecting lugs at the plurality of locations where the second exterior splines are discontinued;
    a sliding synchronizer sleeve engaging the second exterior splines of the central synchronizer ring and movable for engaging the third exterior splines of the pair of synchronizer cone rings and the first exterior splines of the pair of engageable members; and
    a plurality of interlocking clips engaging the pair of synchronizer cone rings at the plurality of locations where the second exterior splines are discontinued and including an aperture for receiving the roller, wherein the plurality of interlocking clips include a pair of end flanges having opposing inner surfaces engaging a pair of ledges on the pair of synchronizer cone rings.

11. The synchronizer assembly of claim 10, wherein the sliding synchronizer sleeve includes a neutral detent, a forward engagement detent and an aft engagement detent which are engageable by the rollers.

12. The synchronizer assembly of claim 11, wherein the forward engagement detent and the aft engagement detent comprise identical geometries.

13. The synchronizer assembly of claim 10, wherein the plurality of interlocking clips are disposed against the axially projecting lugs of the pair of synchronizer cone rings.

14. The synchronizer assembly of claim 10, wherein the pair of synchronizer cone rings each include the pair of ledges being adjacent to the axially projecting lugs.

15. The synchronizer assembly of claim 10, wherein a gap is provided between respective axially projecting lugs of the pair of synchronizer cone rings and the roller is disposed in the gap.

16. The synchronizer assembly of claim 10, wherein a pair of sidewalls of the aperture in the interlocking clips are inclined so as to taper inward toward one another on an outboard side.

17. The synchronizer assembly of claim 10, wherein a pair of sidewalls of the aperture in the interlocking clip include a pair of protrusions.

\* \* \* \* \*